United States Patent
Barta et al.

(10) Patent No.: US 10,160,303 B2
(45) Date of Patent: Dec. 25, 2018

(54) CONTROL SYSTEM FOR AN ACTIVE POWERTRAIN MOUNT

(71) Applicant: BeijingWest Industries Co., Ltd., Beijing (CN)

(72) Inventors: David John Barta, Beavercreek, OH (US); Michael Gerard Zimmerman, Dayton, OH (US); Steven Pyle, New Lebanon, OH (US)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 0 days.

(21) Appl. No.: 15/611,679

(22) Filed: Jun. 1, 2017

(65) Prior Publication Data
US 2018/0009307 A1     Jan. 11, 2018

Related U.S. Application Data

(60) Provisional application No. 62/359,572, filed on Jul. 7, 2016.

(51) Int. Cl.
    *B60N 2/00*        (2006.01)
    *B60K 5/12*        (2006.01)
    (Continued)

(52) U.S. Cl.
CPC .......... *B60K 5/1283* (2013.01); *F16F 15/002* (2013.01); *F16F 15/005* (2013.01); *B60K 17/04* (2013.01)

(58) Field of Classification Search
USPC ............ 248/550, 638; 180/89.12; 188/266.1, 188/267.2
See application file for complete search history.

(56) References Cited

U.S. PATENT DOCUMENTS

| | | |
|---|---|---|
| 4,821,849 A | 4/1989 | Miller |
| 5,096,219 A | 3/1992 | Hanson et al. |

(Continued)

FOREIGN PATENT DOCUMENTS

| | | |
|---|---|---|
| EP | 1650070 | 4/2006 |
| JP | 11325165 | 5/1998 |

(Continued)

OTHER PUBLICATIONS

European Search Report dated Dec. 8, 2017, 10 pages.
First Office Action issued for corresponding Japanese Patent Application 2017-131295 dated Jul. 3, 2018 (Eight pages).

*Primary Examiner* — Steven M Marsh
(74) *Attorney, Agent, or Firm* — William H. Honaker; Dickinson Wright PLLC

(57) ABSTRACT

A control system for an active powertrain mount includes a control signal which is based on the input velocity of the chassis at the active powertrain mount. The control signal may be proportional to the input velocity or to the mount velocity, which is the difference between the input velocity of the chassis at the active powertrain mount and the output velocity of the powertrain component at the active powertrain mount. The input velocity of the chassis at the active powertrain mount may be determined by a controller based on the CG heave and the roll and pitch velocities of the chassis. The output velocity of the powertrain component at the active powertrain mount is determined by the controller by integrating an acceleration signal from a component accelerometer disposed on the powertrain component proximate to the active powertrain mount. Corresponding methods for controlling an active powertrain mount are also provided.

16 Claims, 13 Drawing Sheets

(51) Int. Cl.
*F16F 15/00* (2006.01)
*B60K 17/04* (2006.01)

(56) References Cited

U.S. PATENT DOCUMENTS

| | | | | |
|---|---|---|---|---|
| 5,294,085 A | * | 3/1994 | Lloyd | B60N 2/501 |
| | | | | 248/429 |
| 5,454,443 A | * | 10/1995 | Fischle | B60K 5/1216 |
| | | | | 180/291 |
| 5,582,385 A | | 12/1996 | Boyle et al. | |
| 5,712,783 A | | 1/1998 | Catanzarite | |
| 5,818,353 A | * | 10/1998 | Eaton, Jr. | G01C 9/00 |
| | | | | 248/638 |
| 5,899,288 A | * | 5/1999 | Schubert | F16F 15/027 |
| | | | | 180/89.12 |
| 5,941,920 A | * | 8/1999 | Schubert | F16F 15/02 |
| | | | | 180/89.13 |
| 6,754,571 B2 | | 6/2004 | Gade et al. | |
| 9,758,078 B2 | * | 9/2017 | Haller | B60N 2/505 |
| 2009/0276098 A1 | | 11/2009 | Bodie et al. | |

FOREIGN PATENT DOCUMENTS

| | | |
|---|---|---|
| JP | 11325165 A | 11/1999 |
| WO | 2014026495 | 2/2014 |

* cited by examiner

CONTROL SYSTEM FOR AN ACTIVE POWERTRAIN MOUNT

CROSS REFERENCE TO RELATED APPLICATION

This U.S. utility patent application claims the benefit of U.S. provisional application No. 62/359,572, filed Jul. 7, 2016, the contents of which are incorporated herein by reference in its entirety.

TECHNICAL FIELD

A control system for an active powertrain mount for a vehicle. More particularly, a control system for dynamically adjusting the damping characteristics of an active mount that couples a powertrain component to a vehicle chassis while isolating vibration therebetween.

BACKGROUND OF THE INVENTION

Active powertrain mounts are commonly used in vehicle systems to couple powertrain components to the chassis of a vehicle while isolating vibration therebetween. One common type of active powertrain mount is a magneto-rheological (MR) engine mount that uses a sensor to monitor the pressure of the fluid in the mount to control the mount in an active direction. Such pressure-based control mounts generally require aggressive control to ensure proper operation. Active powertrain mounts with pressure-based control also require a pressure port in the mount which must be sealed, and can be sensitive to temperature because they are dependent on the mount performance. The sensors used for pressure-based control can be damaged by vacuum/pressure spikes.

SUMMARY OF THE INVENTION

According to an aspect of the disclosure, a control system for an active powertrain mount is provided that includes a controller generating a control signal to adjust the damping characteristics of the active powertrain mount based on the output velocity of the powertrain component at the active powertrain mount.

According to another aspect of the disclosure, a method for controlling an active powertrain mount provided. The method includes the steps of generating a control signal for the active powertrain mount based on the output velocity of the active powertrain mount, and transmitting the control signal to the active powertrain mount. The method proceeds with the step of adjusting by the active powertrain mount the damping of the relative motion between the powertrain component and the chassis in response to the control signal.

Active powertrain mounts with acceleration-based or velocity-based control, such as ones constructed in accordance with the present disclosure have several advantages over mounts having pressure-based control. Because no holes or ports are required in the mount, they may have better reliability and simplified packaging that is independent of the mount. Experimental data shows improved performance over pressure-based control with improved temperature sensitivity. Acceleration-based control has also been demonstrated to achieve similar results with reduced current inputs when compared to pressure-based control. Data from the accelerometers provide in an active powertrain mounts with acceleration-based control may also be advantageous for active noise canceling or for use by other vehicle systems, e.g. engine control.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 2:
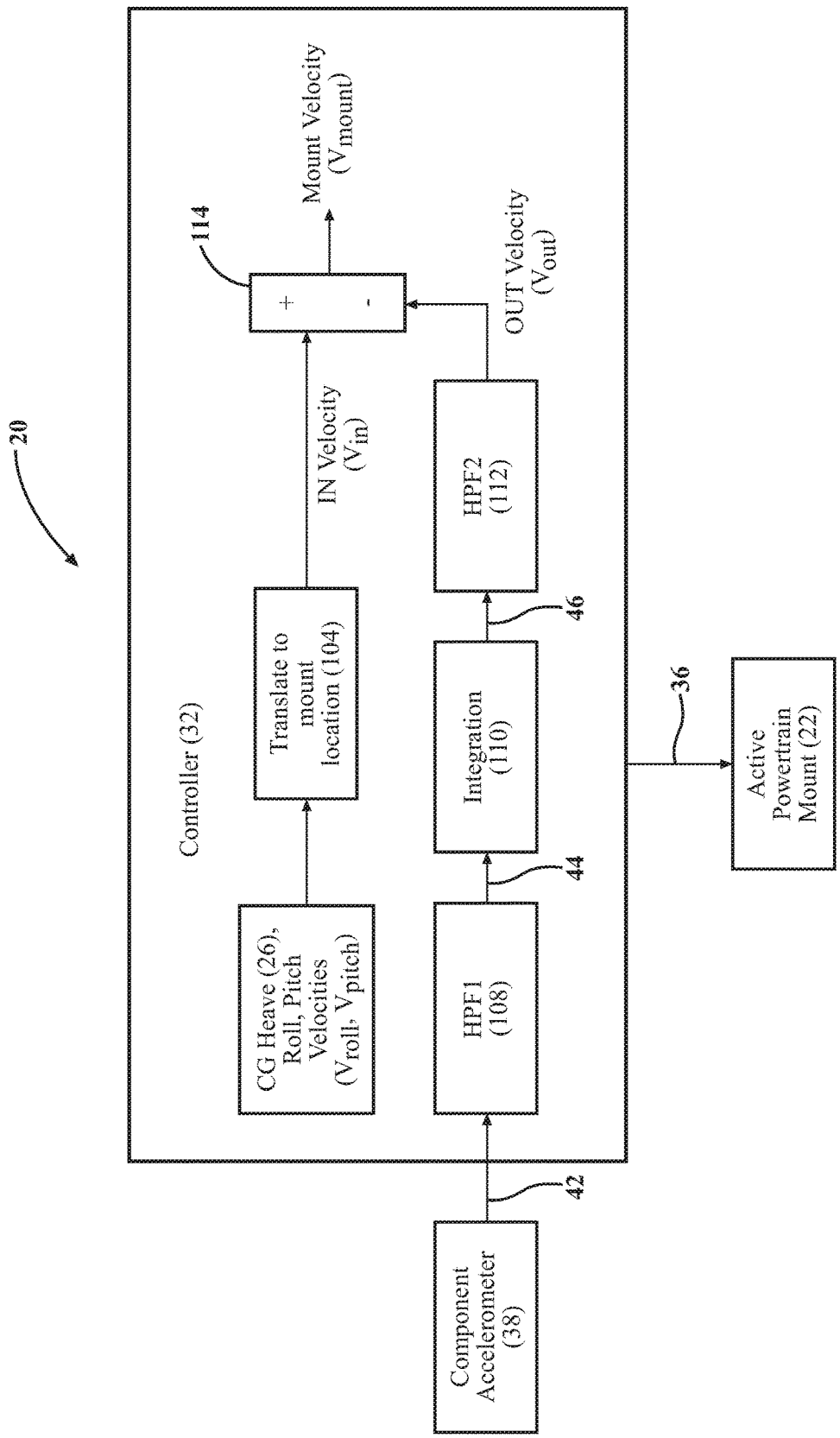
FIG. 2 is a schematic block diagram of a control system for an active powertrain mount.

Referring to the Figures, wherein like numerals indicate corresponding parts throughout the several views, a control system 20 for an active powertrain mount 22 for a vehicle is disclosed in FIG. 2. The system comprises an active powertrain mount 22 attaching a powertrain component 28 to the chassis 24 of the vehicle and adjustably damping vibrations in an active direction therebetween.

According to an aspect of the disclosure, the output velocity $V_{out}$ is determined by the controller 32 based on an acceleration signal 34 from a component accelerometer 38 disposed on the powertrain component 28 proximate to the active powertrain mount 22. The component accelerometer 38 may include a wire pigtail 39 for connection, either directly or indirectly, to the controller 32. The output velocity $V_{out}$ may be the velocity of the powertrain component 28 in the active direction. In other words, the output velocity $V_{out}$ may be the scalar component of the velocity of the powertrain component 28 in the same direction that the active powertrain mount 22 is configured to adjustably dampen.

According to another aspect of the disclosure, the mount velocity $V_{mount}$ is computed as the difference between the input velocity $V_{in}$ of the chassis 24 at the active powertrain mount 22 and the output velocity $V_{out}$ of the powertrain component 28 at the active powertrain mount 22. The input velocity $V_{in}$ of the chassis 24 at the active powertrain mount 22 may be determined by a controller 32 by translating the combination of the heave at the center of gravity, otherwise known as the CG heave $V_{heave}$, the roll velocity $V_{roll}$, and the pitch velocity $V_{pitch}$ of the chassis 24 to the location of the active powertrain mount 22 on the chassis 24. The output velocity $V_{out}$ of the powertrain component 28 at the active powertrain mount 22 is determined by the controller 32 based on an acceleration signal 34 from a component accelerometer 38 disposed on the powertrain component 28 proximate to the active powertrain mount 22. The input velocity $V_{in}$ may be the velocity of the of the chassis 24 at the active powertrain mount 22 in the active direction. In other words, input velocity $V_{in}$ may be the scalar component of the velocity of the chassis 24 at the active powertrain mount 22 in the same direction that the active powertrain mount 22 is configured to adjustably dampen. Likewise, the mount velocity $V_{mount}$ may be a scalar difference in the input velocity $V_{in}$ and the output velocity $V_{out}$ across the active powertrain mount 22 in the same direction that the active powertrain mount 22 is configured to adjustably dampen.

Specifically, the chassis 24 of the vehicle has an associated CG heave $V_{heave}$, a roll velocity $V_{roll}$, and a pitch velocity $V_{pitch}$ which may change as the vehicle is driven. These values may be determined based on one or more accelerometers attached to the chassis 24 or based on operating characteristics of the vehicle such as speed, heading, turning rate, or based on signals from vehicle devices or systems such as suspension, braking, any combination thereof, or any other known method of determining dynamic vehicle characteristics.

Figure 1:
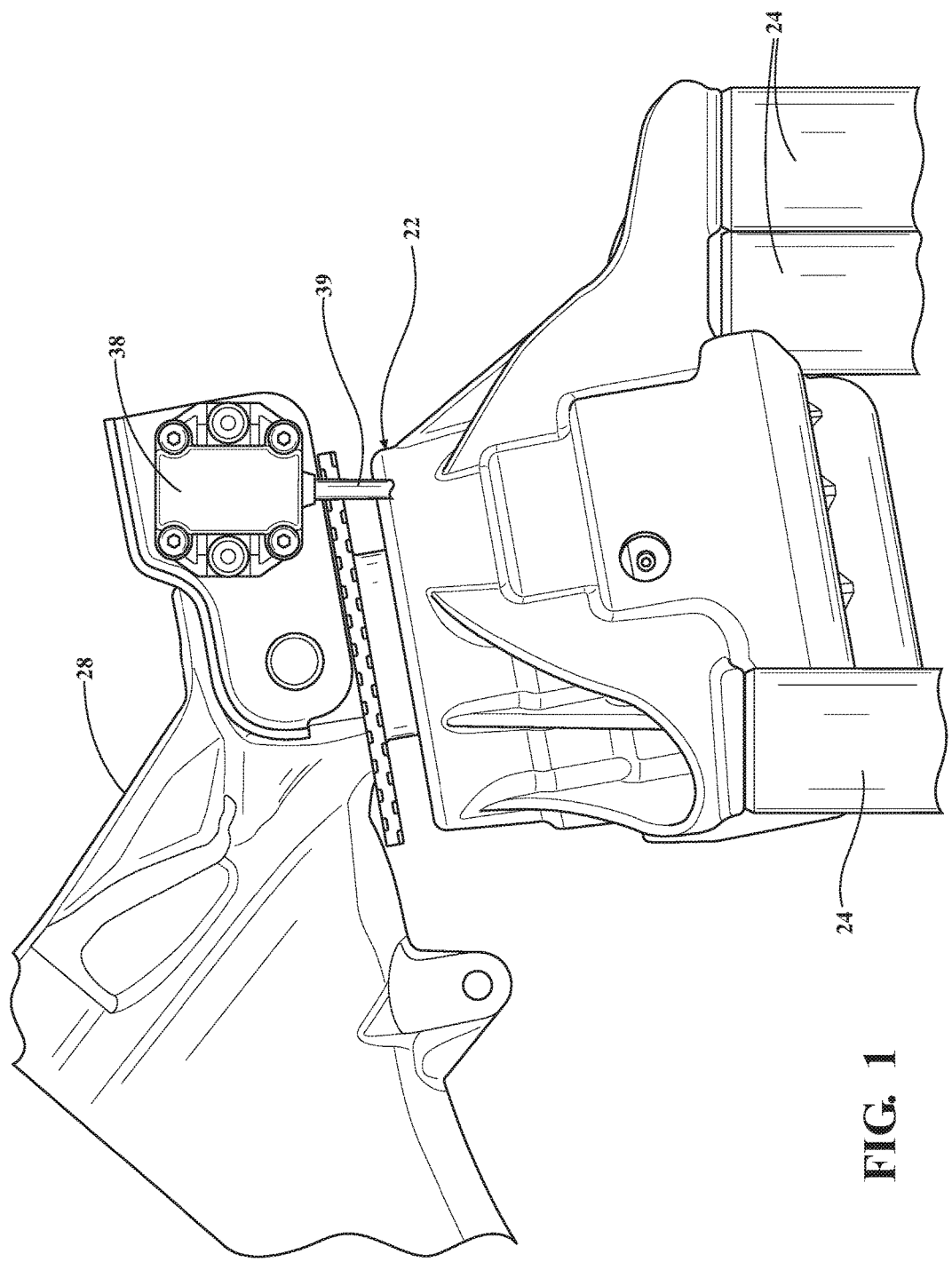
FIG. 1 is a perspective view of an active powertrain mount.

Referring to FIG. 1, an active powertrain mount 22 is disposed between the powertrain component 28 and the chassis 24 operable in an active direction for adjustably damping vibrations therebetween. The active powertrain mount 22 may be fully active to provide an energy in opposition to an applied force. The active powertrain mount 22 may be semi-active to dynamically adjust its characteristics, but without providing energy to actively oppose the applied force. In one embodiment, the powertrain component 28 is an engine and the active powertrain mount 22 is a semi-active magneto-rheological (MR) mount, capable of dynamically adjusting its damping characteristics. The powertrain component 28 may also be a transmission, a differential, an electric motor, or any other component which would benefit from vibration damping and/or isolation from the vehicle's chassis 24, body, or other such structure.

A component accelerometer 38 is disposed on the powertrain component 28 proximate to the active powertrain mount 22 for measuring the acceleration of the powertrain component 28 at that location. The component accelerometer 38 may be mounted to the active powertrain mount 22, such that it is installed as a single assembly with the active powertrain mount 22.

Because accelerometers are influenced by gravity, those used in an active powertrain mount 22 may be influenced by hard braking or acceleration, in addition to the CG heave $V_{heave}$, the roll velocity $V_{roll}$, and the pitch velocity $V_{pitch}$ of the chassis 24. Lat/Long compensation may be provided to compensate from such influences. For example, a compensation factor using the following formula may be used: (reference shift−gravity) [Gain].

According to a first embodiment, a controller 32 may provide a control signal 36 to adjust the damping characteristics of the active powertrain mount 22 based on the output velocity $V_{out}$ of the powertrain component 28 at the active powertrain mount 22, which is determined by the controller 32 based on an acceleration signal 34 from the component accelerometer 38. The control signal 36 may be, for example, proportional to the output velocity $V_{out}$ of the powertrain component 28. According to an aspect, the controller 32 may provide the control signal 36 to the active powertrain mount 22 only with the active powertrain mount 22 in an active control mode. In other words, the controller 32 may inhibit transmission of the control signal 36 to the active powertrain mount with the active powertrain mount 22 in an inactive isolation mode. The controller 32 may place the active powertrain mount 22 in the active control mode in response to the output velocity $V_{out}$ being greater than a first predetermined value 50, and the controller 32 may place the active powertrain mount 22 in the inactive isolation mode in response to the output velocity $V_{out}$ being less than a second predetermined value 52. The first and second predetermined values 50, 52 may be varied according to the operating mode of the vehicle such as, for example, a sport mode, normal mode, winter mode, and/or 2-wheel drive, or 4-wheel drive modes. The first and second predetermined values 50, 52 may also be varied according to other operating characteristics which may include, for example, speed, turning degree, and road condition. Furthermore, time delays and/or filtering may be applied to the output velocity $V_{out}$ in the process of switching the active powertrain mount 22 between the active control mode and the inactive isolation mode.

According to a second embodiment, the controller 32 provides a control signal 36 to adjust the damping characteristics of the active powertrain mount 22 based on the mount velocity $V_{mount}$, which is the difference between the input velocity $V_{in}$ of the chassis 24 at the active powertrain mount 22 and the output velocity $V_{out}$ of the powertrain component 28 at the active powertrain mount 22. The input velocity $V_{in}$ of the chassis 24 at the active powertrain mount 22 may be determined by the controller 32 based on one or more of the heave at the center of gravity, otherwise known as the CG heave $V_{heave}$, the roll velocity $V_{roll}$, and the pitch velocity $V_{pitch}$ of the chassis 24. The output velocity $V_{out}$ of the powertrain component 28 at the active powertrain mount 22 is determined by the controller 32 based on an acceleration signal 34 from the component accelerometer 38. The control signal 36 may be, for example, proportional to the mount velocity $V_{mount}$. According to an aspect, the controller 32 may provide the control signal 36 to the active powertrain mount 22 only with the active powertrain mount 22 in an active control mode. In other words, the controller 32 may inhibit transmission of the control signal 36 to the active powertrain mount with the active powertrain mount 22 in an inactive isolation mode. The controller 32 may place the active powertrain mount 22 in the active control mode or based upon the mount velocity $V_{mount}$. The controller 32 may, for example, switch the active/inactive operating modes by comparing the mount velocity $V_{mount}$ to predetermined values which may be varied according to the operating mode of the vehicle or other operating characteristics which may include, for example, speed, turning degree, and road condition. Furthermore, time delays and/or filtering may be applied to the mount velocity $V_{mount}$ in the process of switching the active powertrain mount 22 between the active control mode and the inactive isolation mode.

Figure 3:
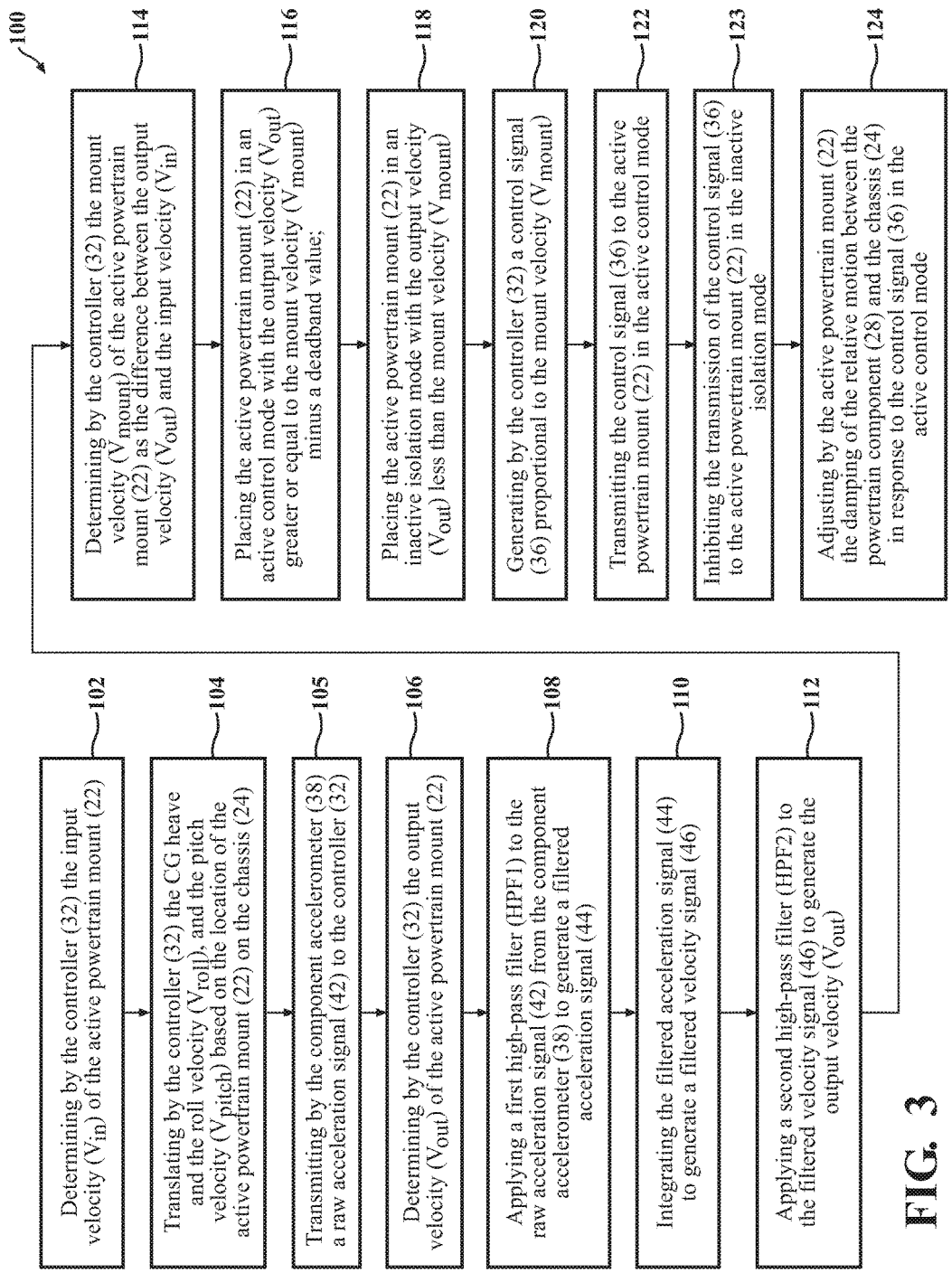
FIG. 3 is a flow chart of a method for controlling an active powertrain mount.

A first method 100 for controlling an active powertrain mount 22 is also disclosed and described in the flow chart of FIG. 3. The first method 100 comprises the step of 102 determining by a controller 32 an input velocity $V_{in}$ of the active powertrain mount 22 by 104 translating by the controller the CG heave $V_{heave}$ and the roll velocity $V_{roll}$ and the pitch velocity $V_{pitch}$ of the chassis based on the location of the active powertrain mount 22 on the chassis 24. The first method 100 also includes the step of 105 transmitting by the component accelerometer 38 a raw acceleration signal 42 to the controller 32; 106 determining by the controller 32 the output velocity $V_{out}$ of the active powertrain mount 22 by 108 applying a first high-pass filter HPF1 to the raw acceleration signal 42 from the component accelerometer 38 to generate a filtered acceleration signal 44 and 110 integrating the filtered acceleration signal 44. The first high-pass filter HPF1 removes the bias from the raw acceleration signal 42 that would otherwise drive the integration to an undesirable high output value. The first method 100 may also include the step of 112 applying a second high-pass filter HPF2 to remove the bias from the output of the integration step so the output velocity $V_{out}$ is provided with only the time-varying portion. The first method 100 proceeds with the step of 114 determining by the controller the mount velocity $V_{mount}$ of the active powertrain mount 22 by subtracting the input velocity $V_{in}$ from the output velocity $V_{out}$.

The first method 100 may also include the step of 116 placing the mount in an active control mode with the output velocity $V_{out}$ greater or equal to the mount velocity $V_{mount}$, which may also be adjusted by the addition or subtraction of a deadband value to improve the response to inputs. The first method 100 may also include the step of 118 placing the mount in an inactive isolation mode with the output velocity $V_{out}$ less than the mount velocity $V_{mount}$, which may also be adjusted by a deadband value. The steps 116, 118 of placing the mount into the active or inactive mode may include a corresponding time delay, which may be different for each respective mode.

The first method 100 proceeds with the step of 120 generating by the controller 32 a control signal 36 based upon the mount velocity $V_{mount}$. The control signal 36 may be proportional to the mount velocity $V_{mount}$. The first method 100 further includes the steps of 122 transmitting the control signal 36 to the active powertrain mount 22 in the active control mode; or 123 inhibiting the transmission of the control signal 36 to the active powertrain mount 22 in the inactive isolation mode. In the active control mode, the first method 100 proceeds with the step of 124 adjusting the damping of the relative motion between the powertrain component 28 and the chassis 24 in response to the control signal 36.

Figure 4:
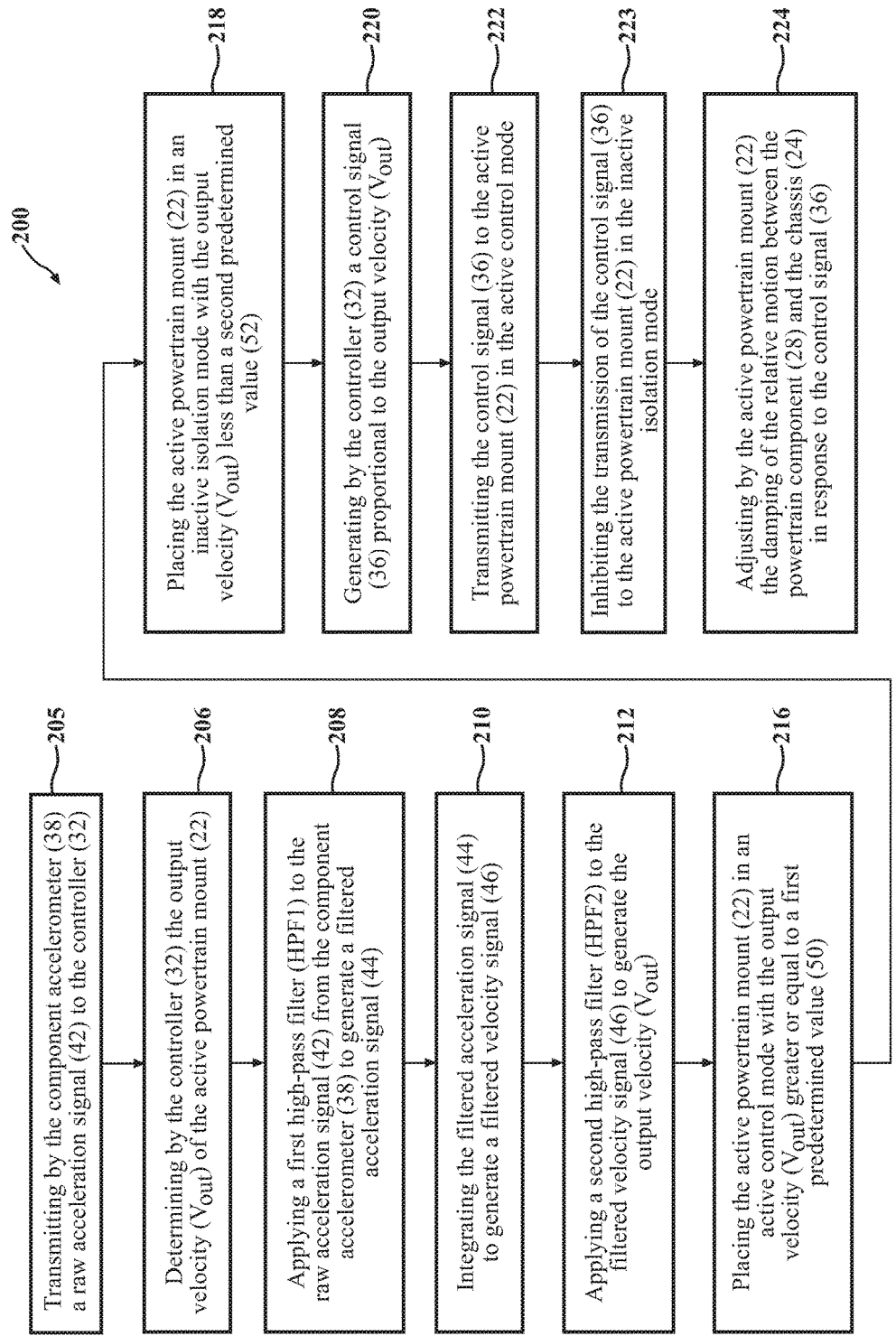
FIG. 4 is a flow chart of another method for controlling an active powertrain mount.
Figure 5A:
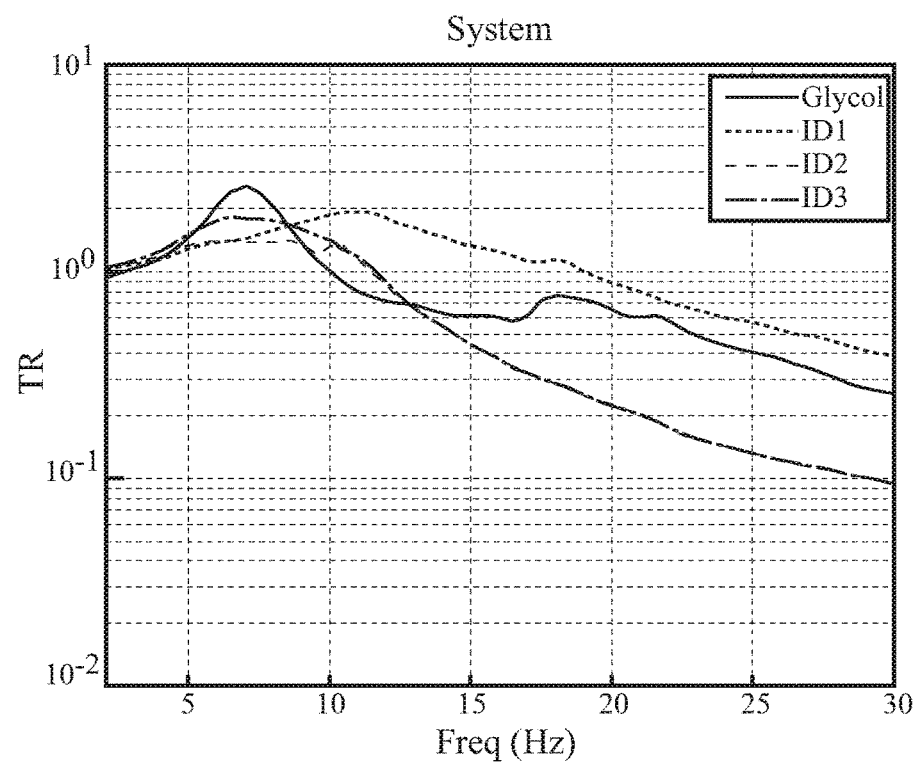
FIG. 5A is a graph showing the Transmissibility (TR) of an active powertrain mount with a +/−0.25 mm chirp input over a range of 0-30 Hz having no active control (Glycol), with pressure-based control (ID1), with accelerometer-based control using the difference between the input and output velocities of the active powertrain mount (ID2), and with accelerometer-based control using only the output velocity of the active powertrain mount (ID3)
Figure 5B:
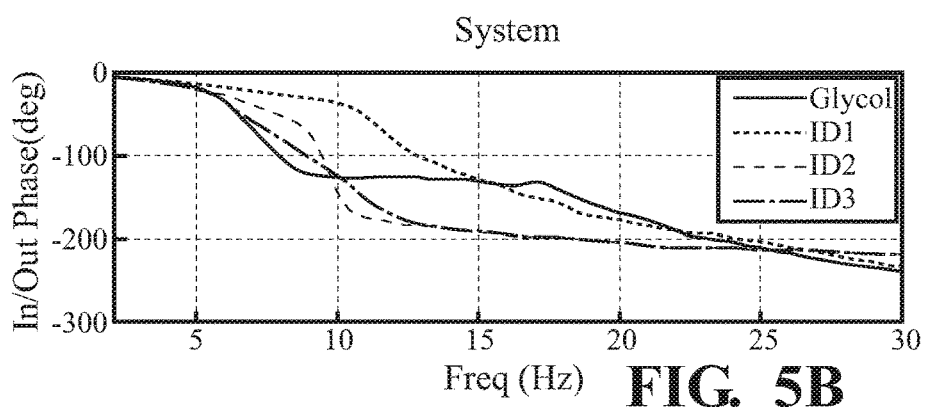
FIG. 5B is a graph showing the In/Out Phase (degrees) of the active powertrain mount of FIG. 5A, with the same input, frequency range, and control methods as in FIG. 5A.
Figure 5C:
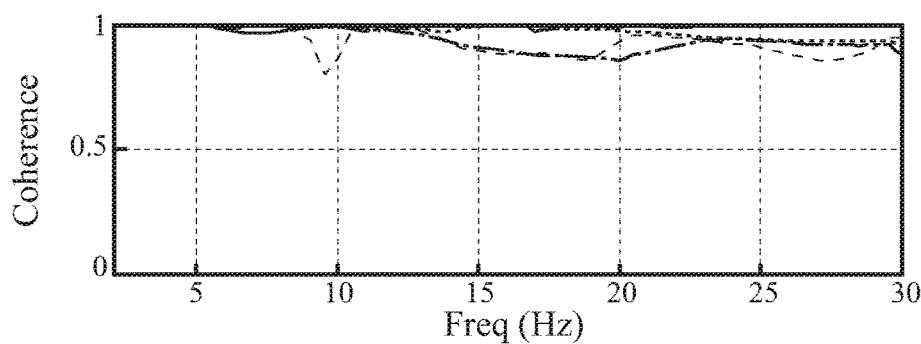
FIG. 5C is a graph showing the Coherence of the active powertrain mount of FIG. 5A, with the same input, frequency range, and control methods as in FIG. 5A.
Figure 6A:
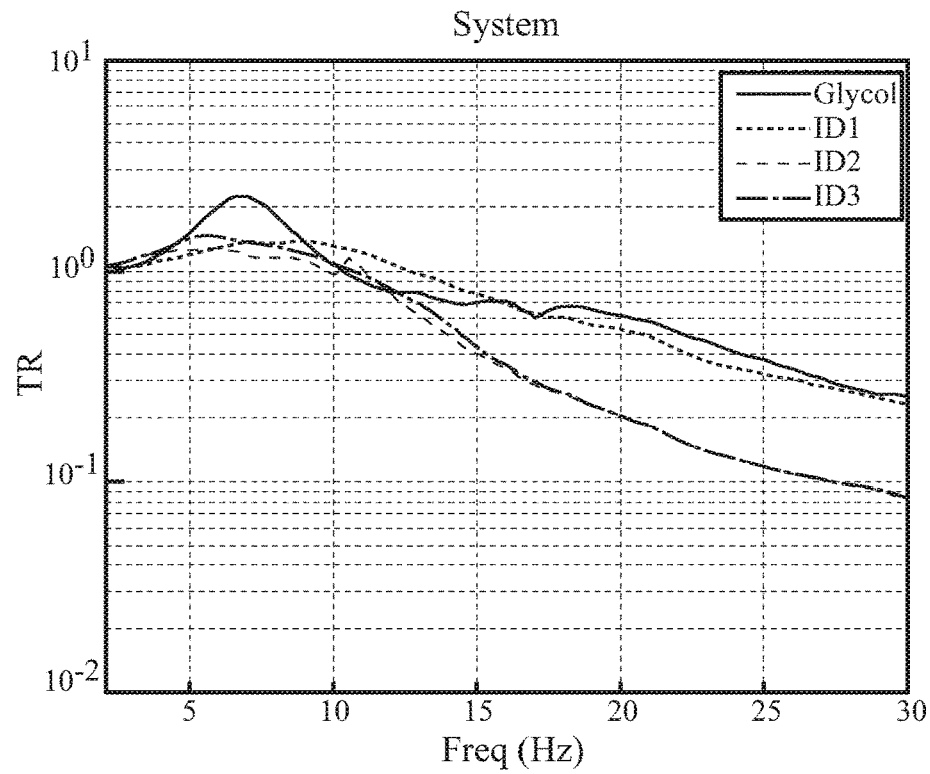
FIG. 6A is a graph showing the Transmissibility (TR) of an active powertrain mount with a +/−0.5 mm chirp input over a range of 0-30 Hz having no active control (Glycol), with pressure-based control (ID1), with accelerometer-based control using the difference between the input and output velocities of the active powertrain mount (ID2), and with accelerometer-based control using only the output velocity of the active powertrain mount (ID3)
Figure 6B:
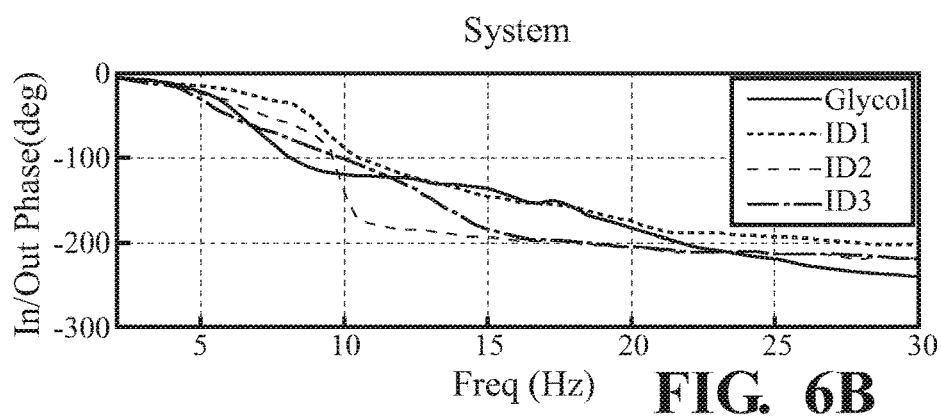
FIG. 6B is a graph showing the In/Out Phase (degrees) of the active powertrain mount of FIG. 6A, with the same input, frequency range, and control methods as in FIG. 6A.
Figure 6C:
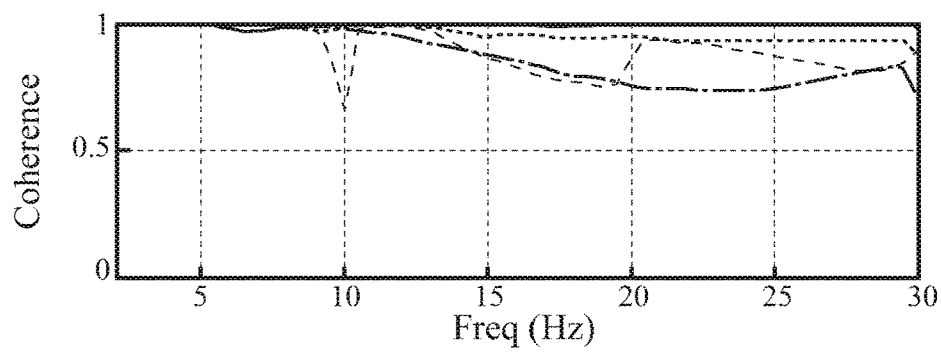
FIG. 6C is a graph showing the Coherence of the active powertrain mount of FIG. 6A, with the same input, frequency range, and control methods as in FIG. 6A.
Figure 7A:
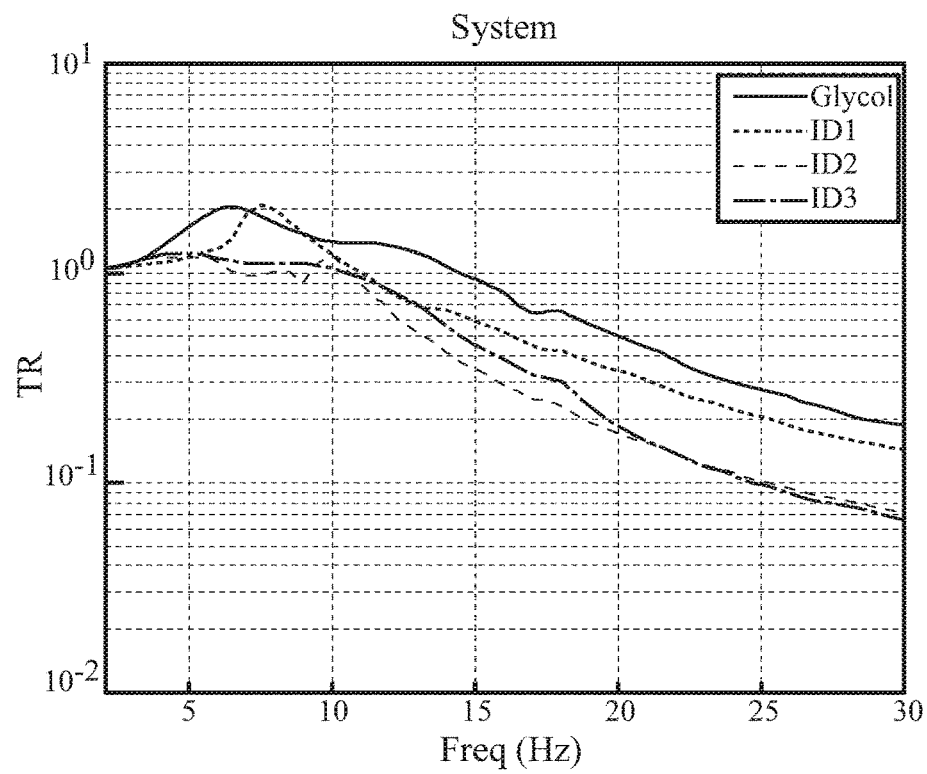
FIG. 7A is a graph showing the Transmissibility (TR) of an active powertrain mount with a +/−1.0 mm chirp input over a range of 0-30 Hz having no active control (Glycol), with pressure-based control (ID1), with accelerometer-based control using the difference between the input and output velocities of the active powertrain mount (ID2), and with accelerometer-based control using only the output velocity of the active powertrain mount (ID3)
Figure 7B:
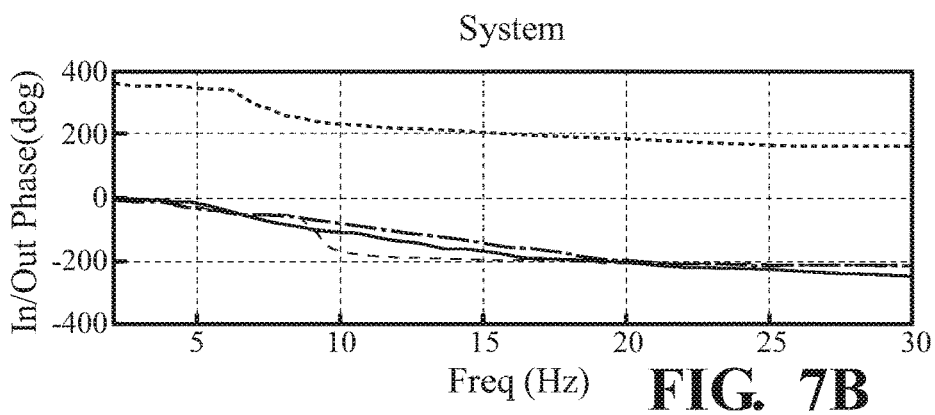
FIG. 7B is a graph showing the In/Out Phase (degrees) of the active powertrain mount of FIG. 7A, with the same input, frequency range, and control methods as in FIG. 7A.
Figure 7C:
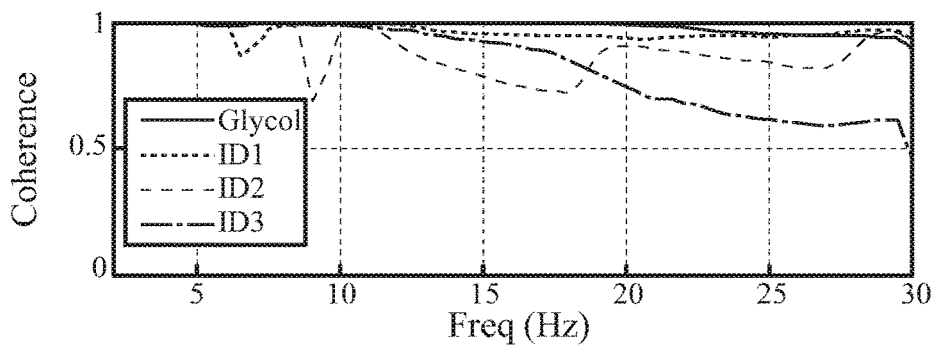
FIG. 7C is a graph showing the Coherence of the active powertrain mount of FIG. 7A, with the same input, frequency range, and control methods as in FIG. 7A.
Figure 8A:
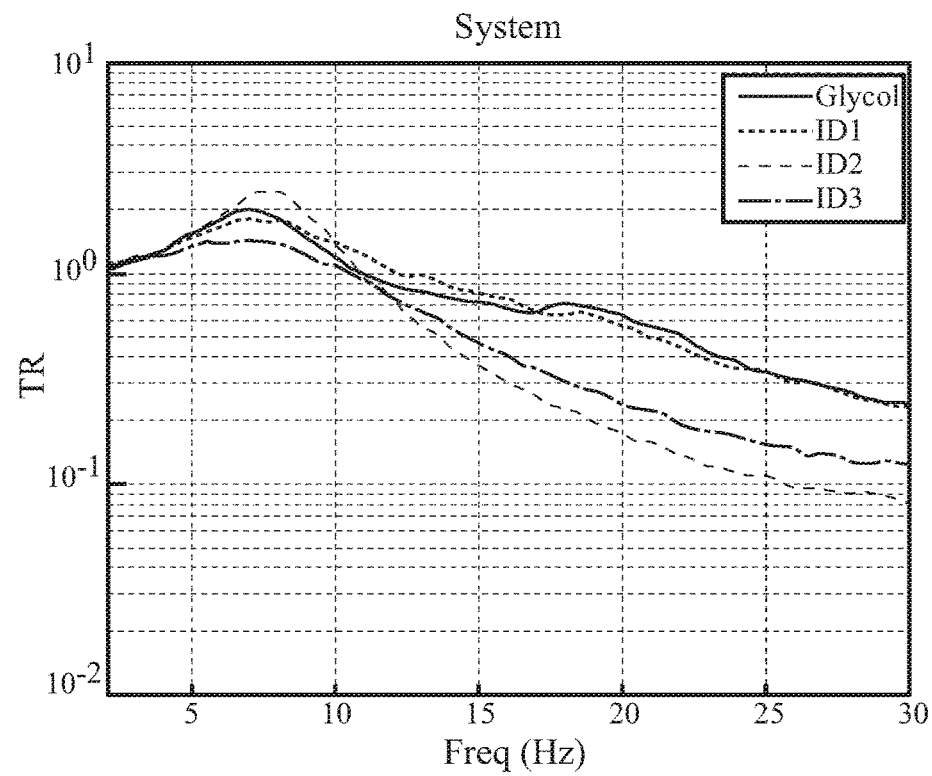
FIG. 8A is a graph showing the Transmissibility (TR) of an active powertrain mount with a random input over a range of 0-30 Hz having no active control (Glycol), with pressure-based control (ID1), with accelerometer-based control using the difference between the input and output velocities of the active powertrain mount (ID2), and with accelerometer-based control using only the output velocity of the active powertrain mount (ID3)
Figure 8B:
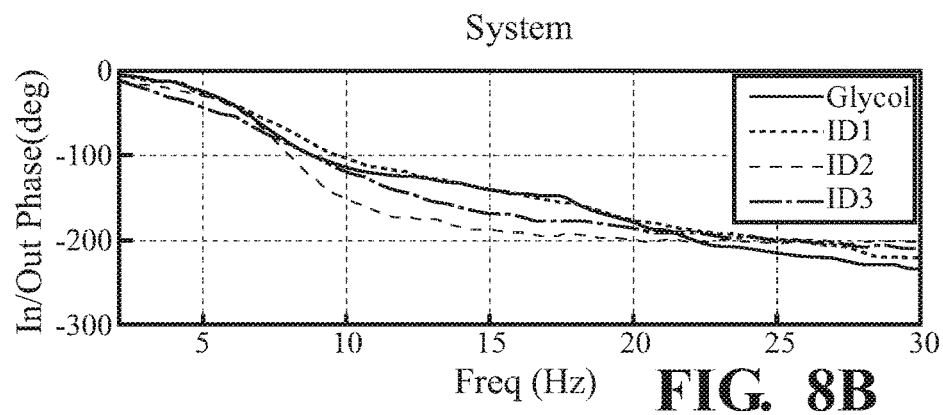
FIG. 8B is a graph showing the In/Out Phase (degrees) of the active powertrain mount of FIG. 8A, with the same input, frequency range, and control methods as in FIG. 8A.
Figure 8C:
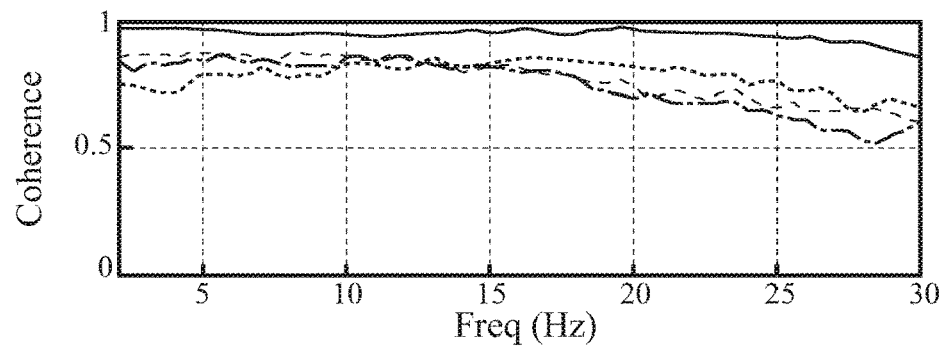
FIG. 8C is a graph showing the Coherence of the active powertrain mount of FIG. 8A, with the same input, frequency range, and control methods as in FIG. 8A.
Figure 9A:
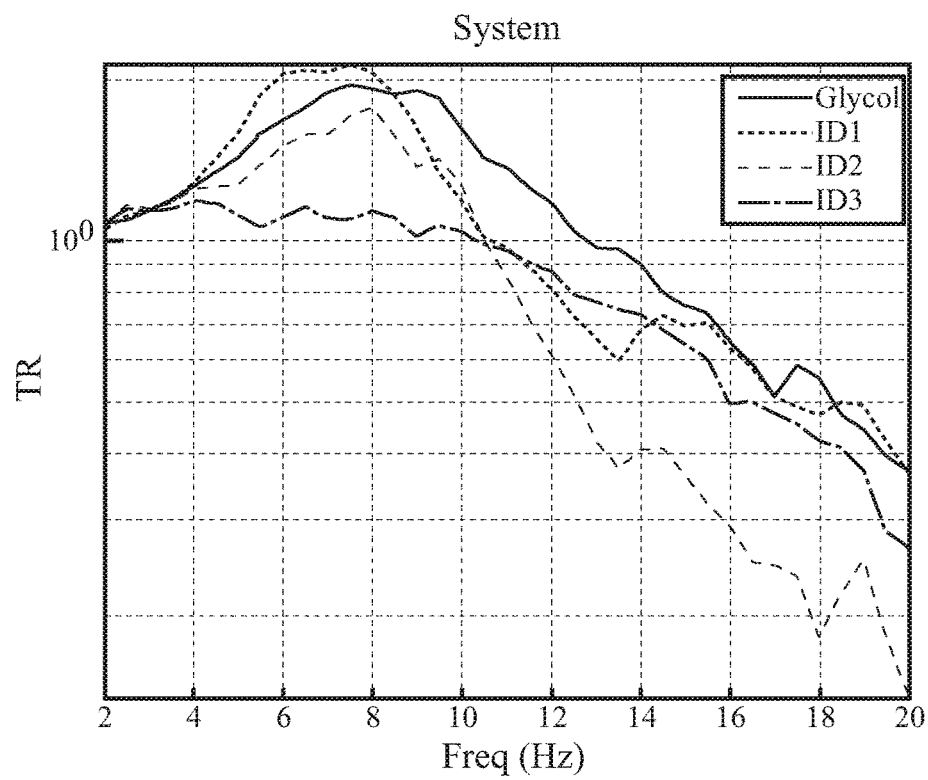
FIG. 9A is a graph showing the Transmissibility (TR) of an active powertrain mount with a Hot Lap input over a range of 0-30 Hz having no active control (Glycol), with pressure-based control (ID1), with accelerometer-based control using the difference between the input and output velocities of the active powertrain mount (ID2), and with accelerometer-based control using only the output velocity of the active powertrain mount (ID3)
Figure 9B:
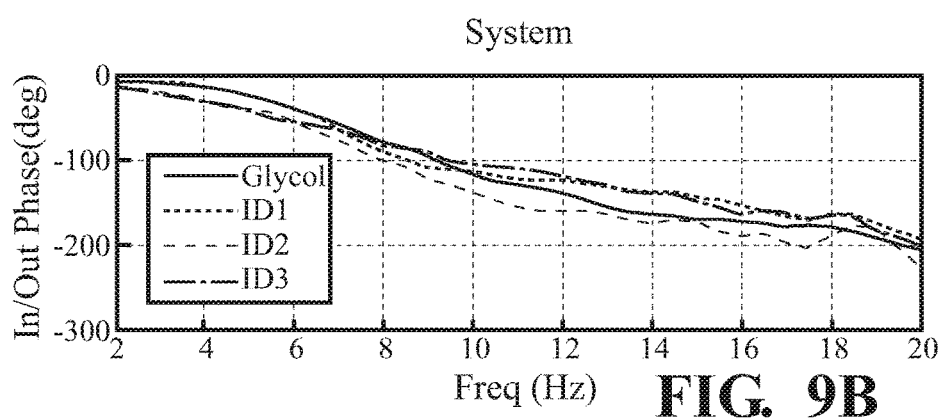
FIG. 9B is a graph showing the In/Out Phase (degrees) of the active powertrain mount of FIG. 9A, with the same input, frequency range, and control methods as in FIG. 9A.
Figure 9C:
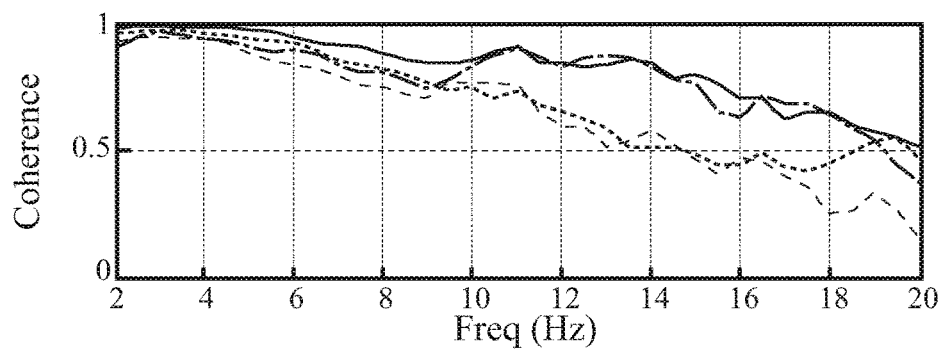
FIG. 9C is a graph showing the Coherence of the active powertrain mount of FIG. 9A, with the same input, frequency range, and control methods as in FIG. 9A.
Figure 10A:
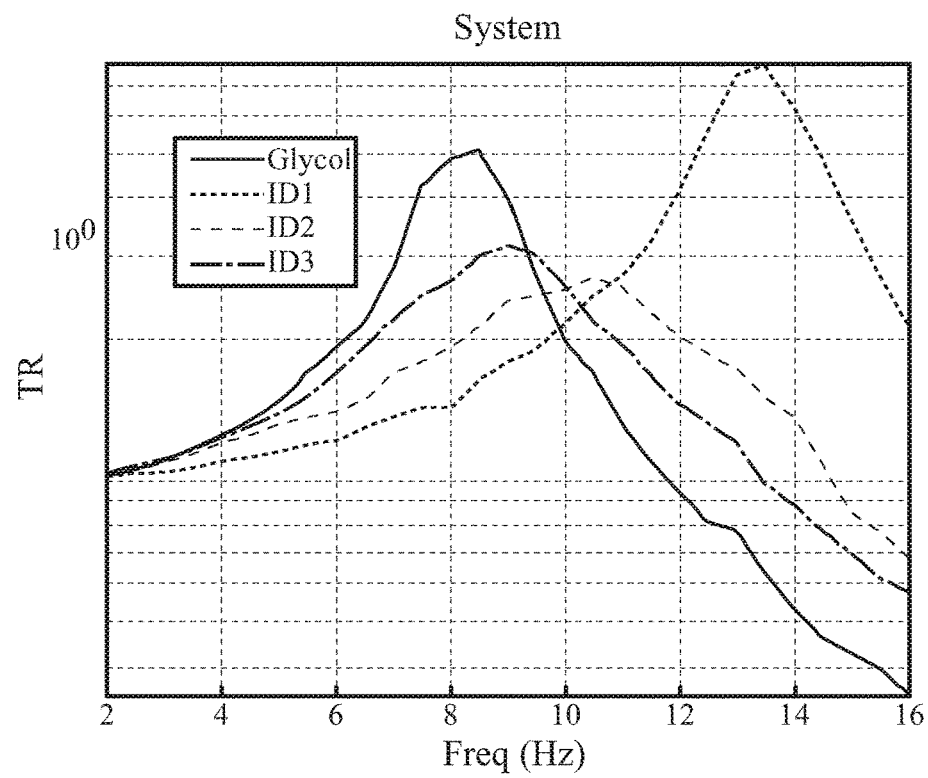
FIG. 10A is a graph showing the Transmissibility (TR) of an active powertrain mount with a "Ride and Comfort" input over a range of 0-30 Hz having no active control (Glycol), with pressure-based control (ID1), with accelerometer-based control using the difference between the input and output velocities of the active powertrain mount (ID2), and with accelerometer-based control using only the output velocity of the active powertrain mount (ID3)
Figure 10B:
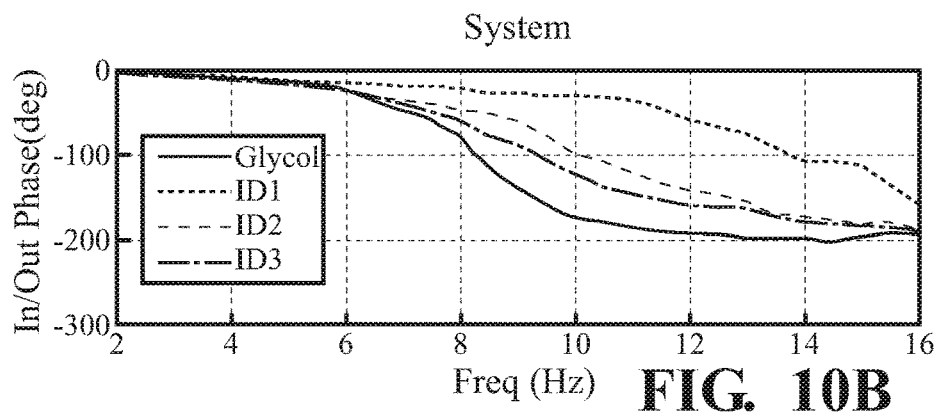
FIG. 10B is a graph showing the In/Out Phase (degrees) of the active powertrain mount of FIG. 10A, with the same input, frequency range, and control methods as in FIG. 10A.
Figure 10C:
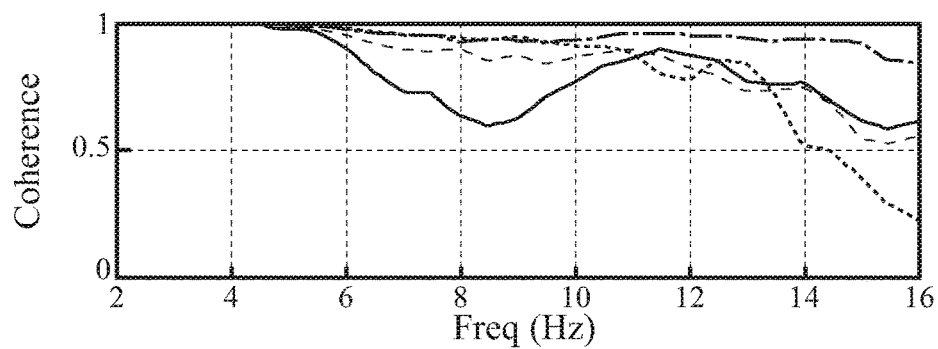
FIG. 10C is a graph showing the Coherence of the active powertrain mount of FIG. 10A, with the same input, frequency range, and control methods as in FIG. 10A.
Figure 11A:
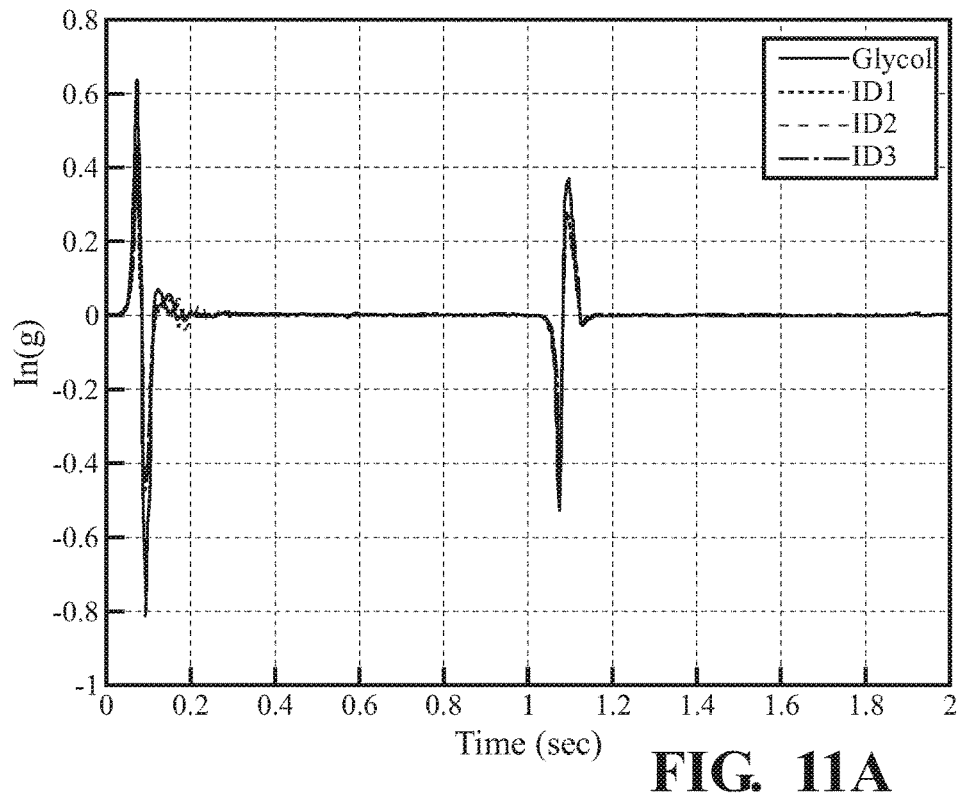
FIG. 11A is a graph of a "Steps" testing event of an active powertrain mount showing the Input (g) vs. Time (seconds)
Figure 11B:
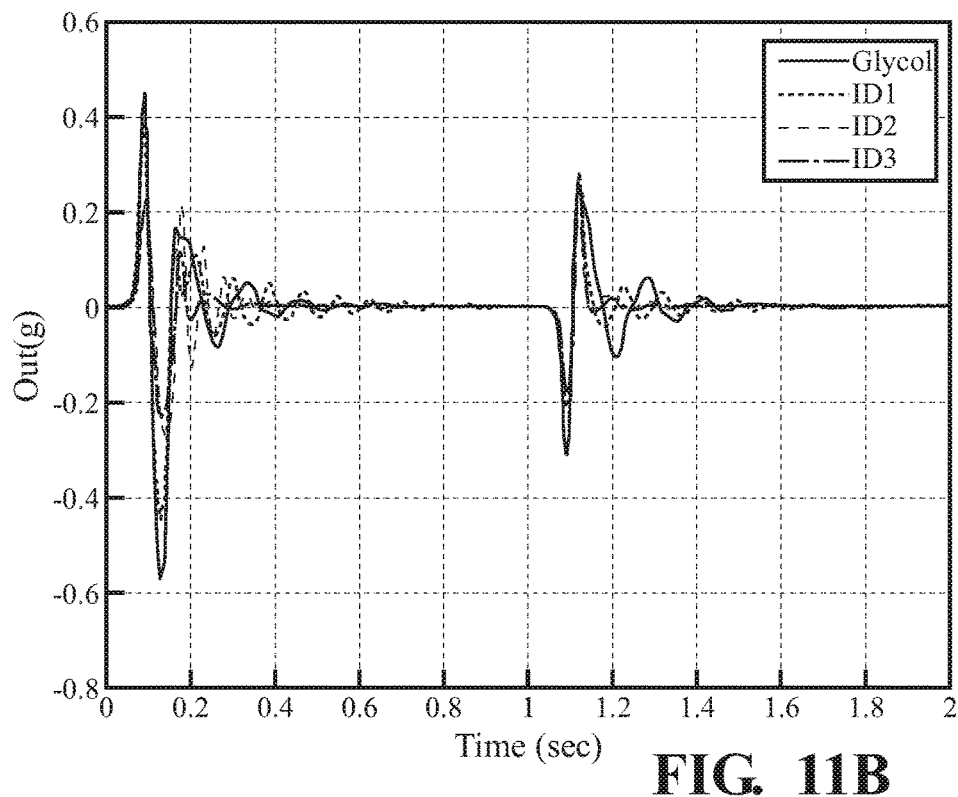
FIG. 11B is a graph of the "Steps" testing event of FIG. 11A showing the Output (g) vs. Time (seconds)
Figure 11C:
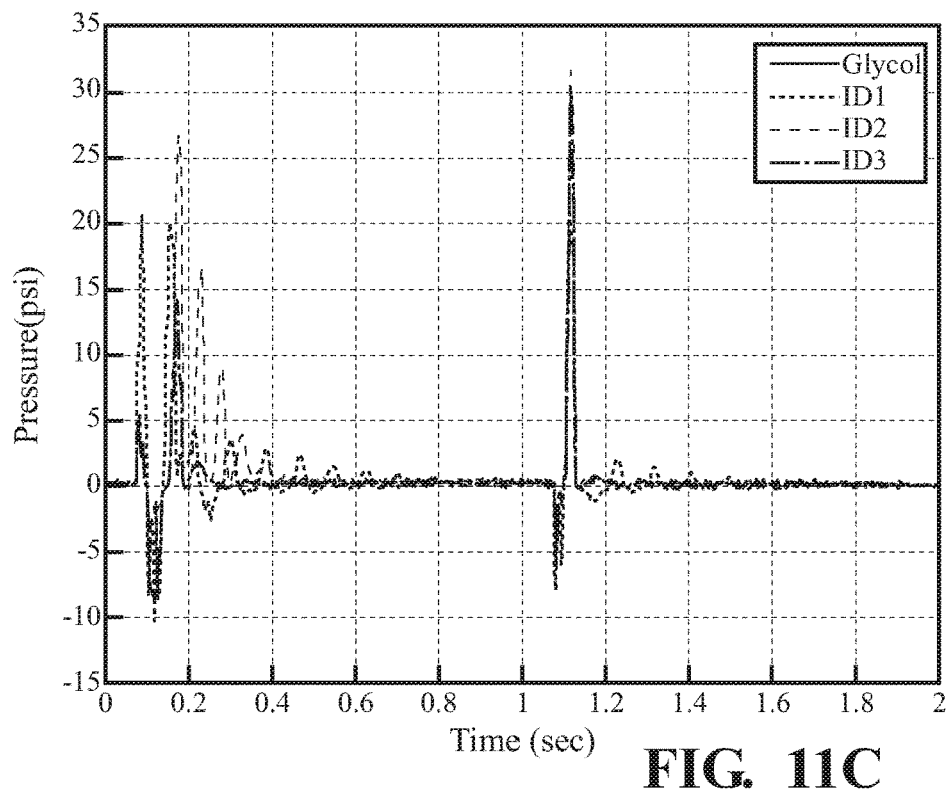
FIG. 11C is a graph of the "Steps" testing event of FIG. 11A showing the Pressure (PSI) vs. Time (seconds)
Figure 11D:
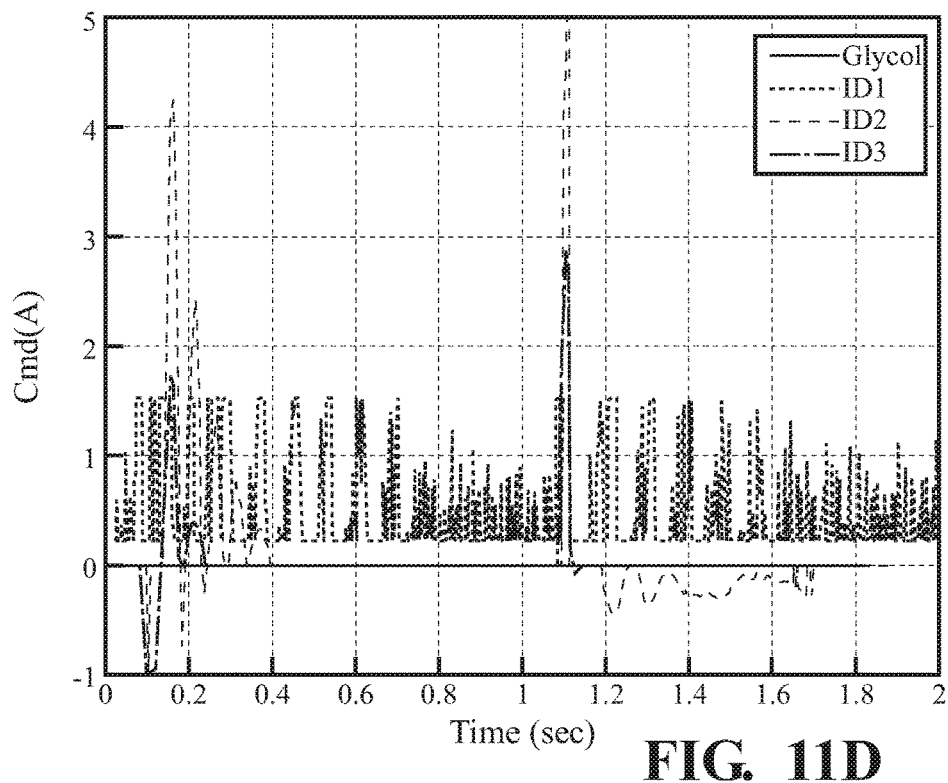
FIG. 11D is a graph of the "Steps" testing event of FIG. 11A showing the Command (A) vs. Time (seconds)
Figure 11E:
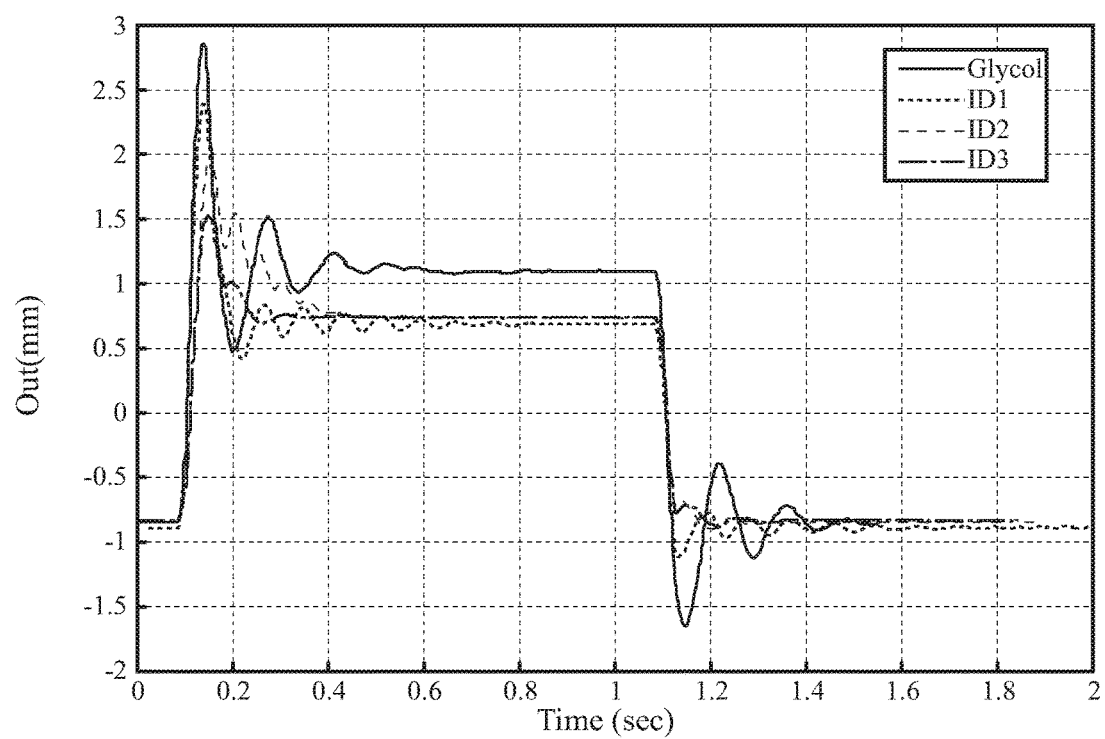
FIG. 11E is a graph of the "Steps" testing event of FIG. 11A showing the Output position (mm) vs. Time (seconds).

An alternative and simplified second method 200 for controlling an active powertrain mount 22 is also disclosed and described in the flow chart of FIG. 4. The second method 200 comprises the steps of 205 transmitting by the component accelerometer 38 a raw acceleration signal 42 to the controller 32; 206 determining by the controller 32 the output velocity $V_{out}$ of the active powertrain mount 22 by 208 applying a first high-pass filter HPF1 to the raw acceleration signal 42 from the component accelerometer 38 to generate a filtered acceleration signal 44 and 210 integrating the filtered acceleration signal 44. The first high-pass filter HPF1 removes the bias from the raw acceleration signal 42 that would otherwise drive the integration to an undesirable high output value. The second method 200 may also include the step of 212 applying a second high-pass filter HPF2 to remove the bias from the output of the integration step so the output velocity $V_{out}$ is provided with only the time-varying portion.

The second method 200 may also include the step of 216 placing the mount in an active control mode with the output velocity $V_{out}$ greater or equal to a first predetermined value 50. The second method 200 may also include the step of 218 placing the mount in an inactive isolation mode with the output velocity $V_{out}$ less than a second predetermined value 52. The steps 216, 218 of placing the mount 22 into the active or inactive mode may include using different values for the respective predetermined values 50, 52, which may vary according to the operating mode of the vehicle such as, for example, a sport mode, normal mode, winter mode, and/or 2-wheel drive, or 4-wheel drive modes. Different values for the respective predetermined values 50, 52 may also be used based on operating characteristics which may include, for example, speed, turning degree, and road condition. The steps 216, 218 of placing the mount 22 into the active or inactive mode may also include waiting for a corresponding time delay period which may also be different for each respective operating mode and/or based on operating parameters of the vehicle.

The second method 200 proceeds with the step of 220 generating by the controller 32 a control signal 36 based upon the output velocity $V_{out}$. The control signal 36 may be, for example, proportional to the output velocity $V_{out}$. The second method 200 further includes the steps of 222 transmitting the control signal 36 to the active powertrain mount 22 in the active control mode; or 223 inhibiting the transmission of the control signal 36 to the active powertrain mount 22 in the inactive isolation mode. In the active control mode, the second method 200 proceeds with the step of 224 adjusting the damping of the relative motion between the powertrain component 28 and the chassis 24 in response to the control signal 36. As shown in the charts of FIGS. 5A through 11E, the second method 200, shown as ID3, generally results in the best performance, with lower transmissibility and lower output current required using most of the tested inputs and across most of the frequency ranges when compared with the prior art pressure control (ID1), or with the first method 100 (ID2).

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

What is claimed is:

1. A control system for an active powertrain mount for a vehicle, comprising:
    an active powertrain mount disposed between a powertrain component and a chassis of the vehicle for adjustably damping vibrations in an active direction therebetween; and
    a controller generating a control signal to adjust the damping characteristics of the active powertrain mount based on an output velocity of the powertrain component at said active powertrain mount,
    wherein the control system further includes a component accelerometer disposed on the powertrain component proximate to the active powertrain mount and transmitting a raw acceleration signal to said controller; and
    wherein said controller determines the output velocity of the powertrain component by applying a first high-pass filter to the raw acceleration signal to generate a filtered acceleration signal and integrating the filtered acceleration signal from the component accelerometer and applying a second high-pass filter thereto.

2. The control system for an active powertrain mount for a vehicle as set forth in claim 1 wherein said control signal is proportional to said output velocity.

3. The control system for an active powertrain mount for a vehicle as set forth in claim 1 wherein said output velocity is the velocity of the powertrain component at said active powertrain mount and in said active direction.

4. The control system for an active powertrain mount for a vehicle as set forth in claim 1 wherein said controller transmits said control signal to said active powertrain mount with said active powertrain mount in an active control mode, and wherein said controller does not transmit said control signal to said active powertrain mount with said active powertrain mount in an inactive isolation mode.

5. The control system for an active powertrain mount for a vehicle as set forth in claim 4 wherein said controller places said active powertrain mount in said active control mode in response to said output velocity being greater than a first predetermined value.

6. The control system for an active powertrain mount for a vehicle as set forth in claim 4 wherein said controller places said active powertrain mount in said inactive isolation mode in response to said output velocity being less than a second predetermined value.

7. The control system for an active powertrain mount for a vehicle as set forth in claim 1, wherein said control signal is proportional to a mount velocity; and
    wherein said controller determines said mount velocity as the difference between an input velocity of the chassis at the active powertrain mount and the output velocity of the powertrain component at the active powertrain mount.

8. The control system for an active powertrain mount for a vehicle as set forth in claim 7 wherein said controller transmits said control signal to said active powertrain mount with said active powertrain mount in an active control mode, and wherein said controller does not transmit said control signal to said active powertrain mount with said active powertrain mount in an inactive isolation mode.

9. The control system for an active powertrain mount for a vehicle as set forth in claim 8 wherein said controller places said active powertrain mount in said active control mode or in said inactive isolation mode based upon said mount velocity.

10. The control system for an active powertrain mount for a vehicle as set forth in claim 7, wherein said chassis has a CG heave, a roll velocity, and a pitch velocity; and
    wherein said controller translates the CG heave, the roll velocity, and the pitch velocity of the chassis to a predetermined location of the active powertrain mount on the chassis to determine said input velocity of the chassis at the active powertrain mount.

11. A control system for an active powertrain mount for a vehicle, comprising:
    a chassis of the vehicle having a CG heave, a roll velocity, and a pitch velocity;
    a powertrain component;
    an active powertrain mount disposed between the powertrain component and the chassis of the vehicle for adjustably damping vibrations therebetween;

a component accelerometer disposed on the powertrain component proximate to the active powertrain mount and transmitting a raw acceleration signal to said controller;

a controller generating a control signal to adjust the damping characteristics of the active powertrain mount based on the mount velocity as the difference between the input velocity of the chassis at the active powertrain mount and the output velocity of the powertrain component at the active powertrain mount, wherein said controller determines the output velocity of the powertrain component by applying a first high-pass filter to the raw acceleration signal to generate a filtered acceleration signal and integrating the filtered acceleration signal from the component accelerometer and applying a second high-pass filter thereto.

12. The control system for an active powertrain mount for a vehicle as set forth in claim 11 wherein said controller translates the CG heave, the roll velocity, and the pitch velocity to a predetermined location of the active powertrain mount on the chassis to determine the input velocity of the chassis at the active powertrain mount.

13. A method for controlling an active powertrain mount for attaching a powertrain component to a chassis of a vehicle, comprising the steps of:

generating by a controller a control signal based on an output velocity of the active powertrain mount;

transmitting the control signal to the active powertrain mount; and adjusting by the active powertrain mount the damping of the relative motion between the powertrain component and the chassis in response to the control signal, wherein a component accelerometer mounted on the powertrain component is further included, and the method further includes the steps of:

transmitting by the component accelerometer a raw acceleration signal to the controller;

determining by the controller the output velocity of the active powertrain mount by applying a first high-pass filter to the raw acceleration signal to generate a filtered acceleration signal and integrating the filtered acceleration signal from the component accelerometer and applying a second high-pass filter thereto.

14. The method for controlling an active powertrain mount for attaching a powertrain component to a chassis of a vehicle as set forth in claim 13 wherein the control signal is proportional to the output velocity (Vout) of the active powertrain mount.

15. The method for controlling an active powertrain mount for attaching a powertrain component to a chassis of a vehicle as set forth in claim 13, further including the steps of:

placing the active powertrain mount in an active control mode with the output velocity greater than or equal to a first predetermined value;

placing the active powertrain mount in an inactive isolation mode with the output velocity less than a second predetermined value;

transmitting the control signal to the active powertrain mount in the active control mode; and inhibiting the transmission of the control signal to the active powertrain mount in the inactive isolation mode.

16. The method for controlling an active powertrain mount for attaching a powertrain component to a chassis of a vehicle as set forth in claim 13, wherein the chassis of the vehicle has a CG heave, a roll velocity, and a pitch velocity, and the method further includes:

determining by a controller the input velocity of the active powertrain mount as the heave velocity of the chassis at the active powertrain mount by translating the CG heave and the roll velocity, and the pitch velocity based on the location of the active powertrain mount on the chassis;

determining the mount velocity of the active powertrain mount by subtracting the input velocity from the output velocity; and generating by the controller a control signal proportional to the mount velocity.

\* \* \* \* \*